United States Patent
Kato (10) Patent No.: US 7,971,864 B2
(45) Date of Patent: Jul. 5, 2011

(54) POSITIONING METHOD AND DEVICE FOR COLUMNAR STRUCTURE

(75) Inventor: Shigeki Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1364 days.

(21) Appl. No.: 11/501,854

(22) Filed: Aug. 10, 2006

(65) Prior Publication Data

US 2007/0051220 A1    Mar. 8, 2007

(30) Foreign Application Priority Data

Aug. 19, 2005    (JP) .................................. 2005-238515

(51) Int. Cl.
*B25B 5/16*    (2006.01)
(52) U.S. Cl. .............................. 269/43; 269/45; 269/291
(58) Field of Classification Search .................... 269/43, 269/45, 291, 900, 71, 49; 452/65, 41, 292
See application file for complete search history.

(56) References Cited

U.S. PATENT DOCUMENTS

| | | | | |
|---|---|---|---|---|
| 6,250,991 B1 * | 6/2001 | Afif | ................................. | 451/41 |
| 6,379,230 B1 * | 4/2002 | Hayashi et al. | ............... | 451/292 |
| 6,435,941 B1 * | 8/2002 | White | ................................ | 451/5 |
| 6,637,737 B1 * | 10/2003 | Beecherl et al. | ................ | 269/71 |
| 6,955,345 B2 * | 10/2005 | Kato | ............................... | 269/61 |
| 2007/0051220 A1 * | 3/2007 | Kato | ............................... | 83/412 |

FOREIGN PATENT DOCUMENTS

| | | |
|---|---|---|
| JP | A 2004-141708 | 5/2004 |
| JP | A 2004-141709 | 5/2004 |

\* cited by examiner

*Primary Examiner* — Lee D Wilson
(74) *Attorney, Agent, or Firm* — Oliff & Berridge, PLC (57) ABSTRACT

The method and the device for positioning a columnar structure which can promote properties of the resulting columnar structure, such as thermal shock resistance, isostatic strength, thermal stress, mechanical stress, and the like, and can exhibit improved productivity due to excellent drying performance of the coated areas by approximation of the central axis of the columnar structure and the central axis of the seat, thereby flattening the coating thickness when a coating is applied to the outer circumferential surface of the columnar structure, are provided. After causing the positioning fixture to abut on the seat mounting the columnar structure thereon, the columnar structure is moved from the seat using a positioning adjustment fixture placed opposing the positioning fixture, while keeping the columnar structure to abut on the positioning adjustment fixture at one or two points, thereby causing the columnar structure to abut on the positioning fixture.

4 Claims, 6 Drawing Sheets

POSITIONING METHOD AND DEVICE FOR COLUMNAR STRUCTURE

BACKGROUND OF THE INVENTION

1. Field of the Invention

The present invention relates to a method and a device for positioning a columnar structure.

2. Background Art

When a coating is applied to an outer circumference of a columnar structure with a curved surface such as a cylindrical column and an elliptic cylindrical column (e.g. a honeycomb structure and a diesel particulate filter), most coating works rely on manual labor. When labor is relied upon, skilled workmen are required and manual works take a large amount of man-hours. In addition, a low efficiency must be accepted in order to obtain a large amount of appropriately coated products. This step is a bottleneck in some manufacturing processes.

A device and a method have been proposed for coating an outer circumferential surface of a columnar structure that can apply a thin and uniform coating to the outer circumferential surface of a columnar structure and thus can prevent flaws, peeling, and occurrence of cracks in the coated part after coating and during drying (see Japanese Patent Applications Laid-open No. 2004-141708 and No. 2004-141709).

Figure 4A:
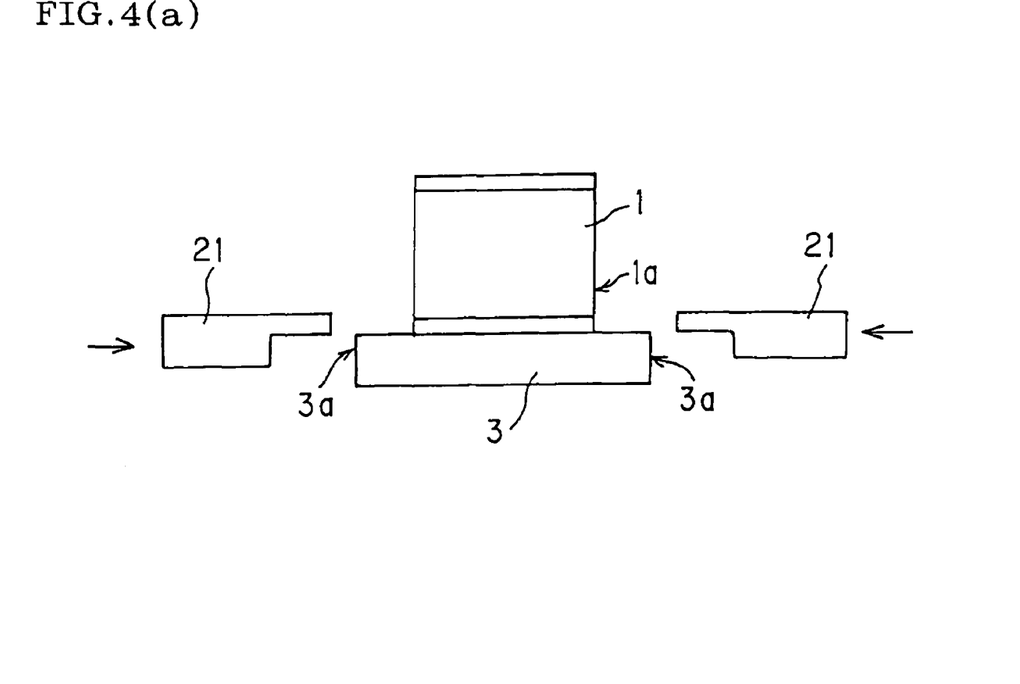
FIG. 4(a) is a front view showing arrangement of positioning fixtures when the columnar structure is mounted on a seat and FIG. 4(b) is a front view showing the state in which the columnar structure is positioned using centering boards (positioning fixtures) in a manner so that its central axis may approximately coincide with the central axis of the seat.
Figure 4B:
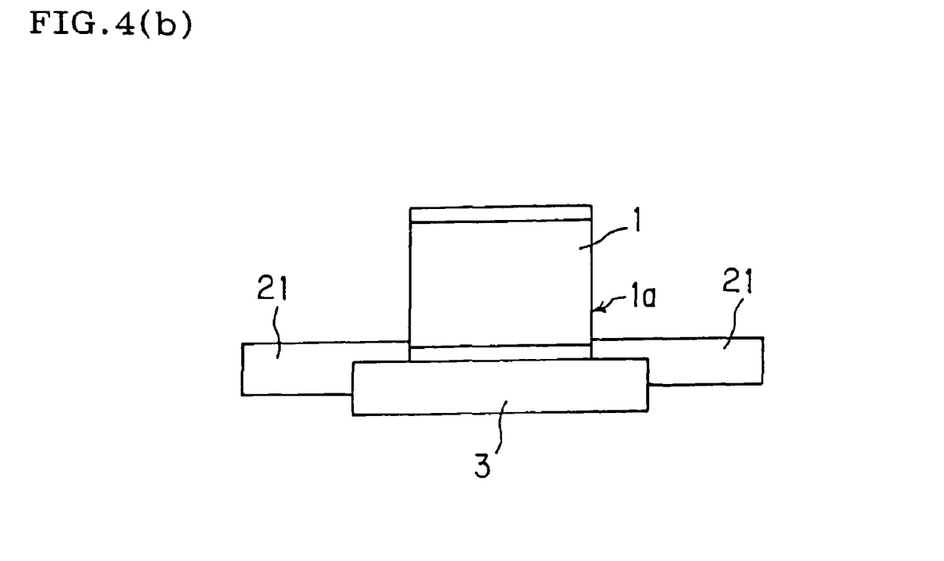

In this method, a positioning device as shown in FIGS. 4(a) and 4(b), for example, is used for positioning the central axis of the columnar structure which is mounted on a seat of the outer circumferential surface coating device. As shown in FIG. 4(a), this positioning device can cause the central axis of the columnar structure 1 to approximately coincide with the central axis of a seat 3 by moving the columnar structure 1, while causing centering boards (positioning fixtures) 21 and 21 on either side to slide in relation to the columnar structure 1 mounted on the seat 3 by a driving force (servo+air cylinder) and at the same time, causing the centering boards 21 and 21 to abut on the columnar structure 1 (see FIG. 4(b)). The area of the centering board 21 coming in contact with the outer circumferential surface 1a has a configuration conforming to the shape of the outer circumferential surface 1a. In the case of a cylindrical columnar structure 1, for example, a centering board (positioning fixture) 21 having a circular arc 22 as shown in FIG. 5 is used.

However, in the positioning device shown in FIGS. 4(a) and 4(b), it is difficult in practice to cause the centering boards (positioning fixtures) 21 and 21 on either side to slide and simultaneously abut on the columnar structure 1. In addition, since the device does not possess a means for maintaining a fixed distance between the central axis of the columnar structure 1 and the central axis of the seat 3, when either of the centering boards (positioning fixtures) 21 and 21 abut on the outer circumferential surface 1a, the central axis of the columnar structure 1 is shifted toward the centering board 21 that has first come in contact with the outer circumferential surface 1a, thereby unduly impairing precision of coincidence of the central axis of the columnar structure 1 and the central axis of the seat 3.

Figure 5:
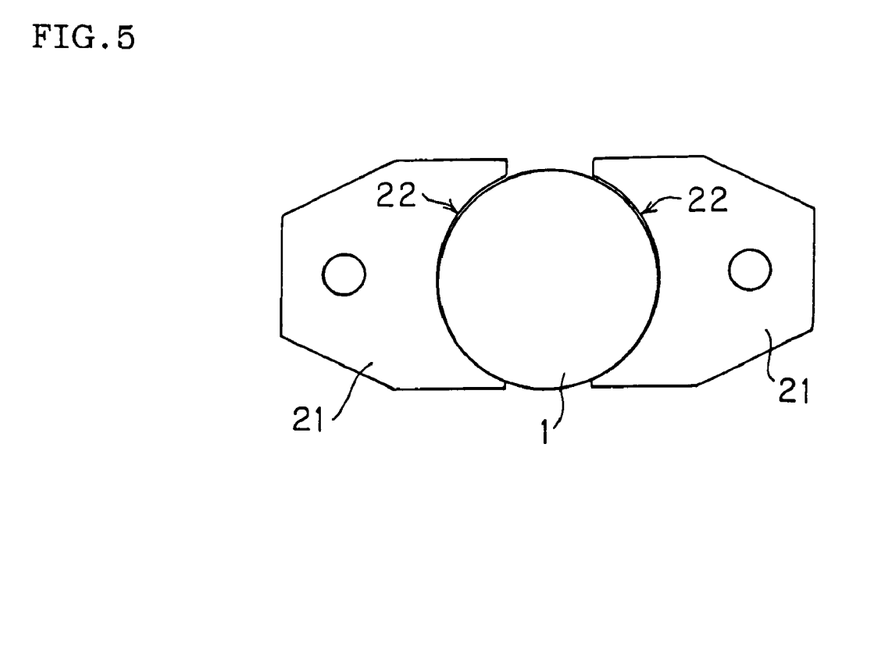
FIG. 5 is a plan of FIG. 4(b).

Moreover, since the positioning device shown in FIGS. 4(a) and 4(b) has the area coming in contact with the outer circumferential surface 1a of the centering board 21 in the shape conforming to the outer circumferential surface 1a of the columnar structure 1 (circular arc 22) as shown in FIG. 5, that is, since these parts abut face-to-face, the precision of coincidence of the central axis of the columnar structure 1 and the central axis of the seat 3 fluctuates according to the circumferential configuration of the columnar structure 1.

Figure 6:
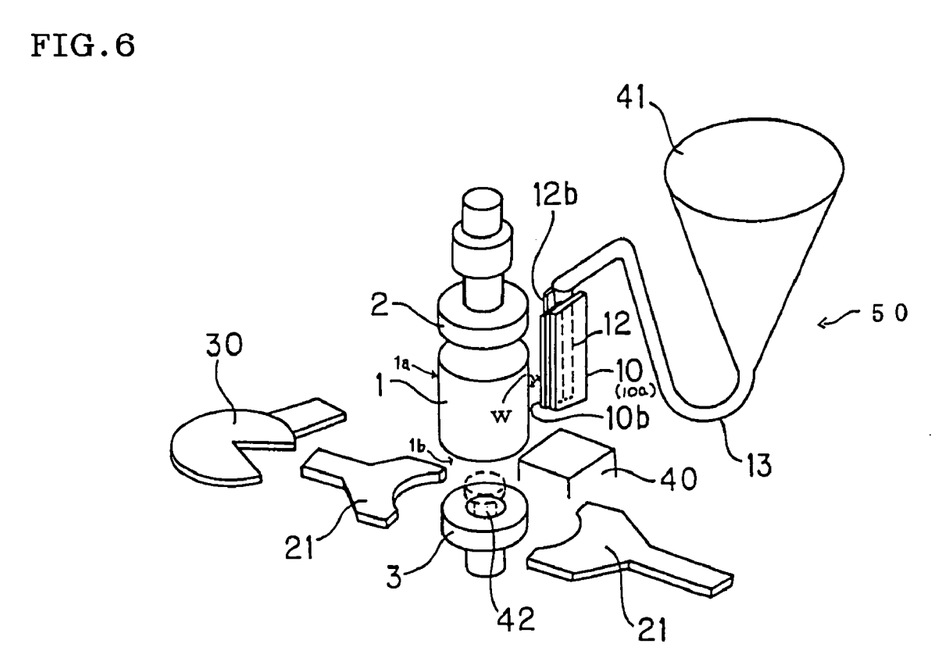
FIG. 6 is a perspective view schematically showing one embodiment of the device for coating the outer circumferential surface of a columnar structure.

If the precision of coincidence of the central axis of the columnar structure 1 and the central axis of the seat 3 is impaired for these reasons, in the case in which the device is applied to an outer circumferential surface coating device shown in FIG. 6, for example, a clearance w may become too small in some area and, when the outer circumferential surface 1a of the columnar structure 1 comes in contact with a leveling board 10a, the coating may produce flaws or be peeled off because the leveling board 10a is made of a hard material such as SUS or ceramics. When the clearance w between the outer circumferential surface 1a of the columnar structure and the leveling board 10a is excessively enlarged in order to avoid the contact, the coating thickness unduly increases and cracks may be produced in the coating during drying.

If there are variations in the coating thickness of the resulting columnar structure, not only properties such as thermal shock resistance, isostatic strength, thermal stress, mechanical stress, and the like are impaired, but also cracks are easily produced in thick portions of the coating when forced drying is applied, resulting in poor productivity.

The present invention has been achieved in view of the above-described problems of the related art. An objective of the present invention is to provide a method and a device for positioning a columnar structure that can promote properties of the resulting columnar structure (ceramic honeycomb structure), such as thermal shock resistance, isostatic strength, thermal stress, mechanical stress, and the like, and can exhibit improved productivity due to excellent drying performance of the coated areas by approximation of the central axis of the columnar structure and the central axis of the seat, thereby flattening the coating thickness when a coating is applied to the outer circumferential surface of the columnar structure.

SUMMARY OF THE INVENTION

In order to achieve the above object, the present invention provides the following method and device for positioning a columnar structure.

[1] A method for positioning a columnar structure comprising: mounting the columnar structure on a seat, causing a positioning fixture to abut on the seat on which the columnar structure is mounted, and moving the columnar structure from the seat using a positioning adjustment fixture facing vis-à-vis the positioning fixture while keeping the columnar structure abutting on the positioning adjustment fixture, so as to cause the columnar structure to abut on the positioning fixture, thereby causing the central axis of the columnar structure to approximately coincide with the central axis of the seat, with the columnar structure being supported at three or four points by the positioning fixture and the positioning adjustment fixture.

[2] The method according to [1], wherein the positioning adjustment fixture does not abut on the side of the seat.

[3] The method according to [1] or [2], wherein the positioning fixture and/or the positioning adjustment fixture have a rectangularly concave cross-section.

[4] The method according to any one of [1] to [3], wherein the positioning fixture has a convex cross-section.

[5] The method according to any one of [1] to [4], wherein the columnar structure is a ceramic honeycomb structure.

[6] A device for positioning a columnar structure comprising a seat for mounting the columnar structure, a positioning fixture which can move so as to approach or withdraw from either the left or right side of the seat or abut on the seat, and a positioning adjustment fixture provided facing vis-à-vis the positioning fixture, which after the positioning fixture has abutted on the seat, causes the columnar structure to move and abut on the positioning fixture, while keeping the positioning adjustment fixture abutting on the columnar structure, thereby causing the central axis of the columnar structure to approximately coincide with the central axis of the seat.

[7] The device according to [6], wherein the positioning adjustment fixture has a sliding member which does not abut on the side of the seat.

[8] The device according to [6] or [7], wherein the positioning fixture and/or the positioning adjustment fixture have a rectangularly concave cross-section.

[9] The device according to any one of [6] to [8], wherein the positioning adjustment fixture has a convex cross-section.

[10] The device according to any one of [6] to [9], wherein the columnar structure is a ceramic honeycomb structure.

The method and the device for positioning a columnar structure of the present invention can promote properties of the resulting columnar structure (ceramic honeycomb structure), such as thermal shock resistance, isostatic strength, thermal stress, mechanical stress, and the like, and can exhibit improved productivity due to excellent drying performance of the coated areas by approximation of the central axis of the columnar structure and the central axis of the seat, thereby flattening the coating thickness when a coating is applied to the outer circumferential surface of the columnar structure.

BRIEF DESCRIPTION OF THE DRAWINGS

FIGS. 1(a) (b) (c) are schematic illustrations of one embodiment of a method and a device for positioning a columnar structure of the present invention, wherein

FIGS. 4(a) (b) are schematic illustrations of one example of the related-art method and device for positioning a columnar structure, wherein

FIGS. 7(a) (b) show the coating thickness of a cross-section in the diameter direction of a coated honeycomb structure, wherein

DETAILED DESCRIPTION OF THE INVENTION

Specific embodiments of the method and the device for positioning a columnar structure of the present invention will now be described in detail. The present invention, however, should not be construed as being limited to these embodiments. Various alterations, modifications, and improvements are possible within the scope of the present invention by persons skilled in the art.

Figure 1A:
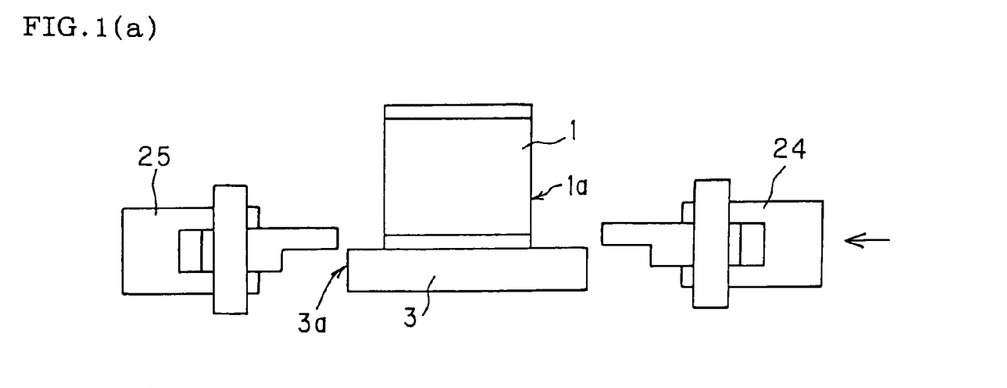
FIG. 1(a) is a front view showing arrangement of a positioning fixture and a positioning adjustment fixture when the columnar structure is mounted on a seat.
Figure 1B:
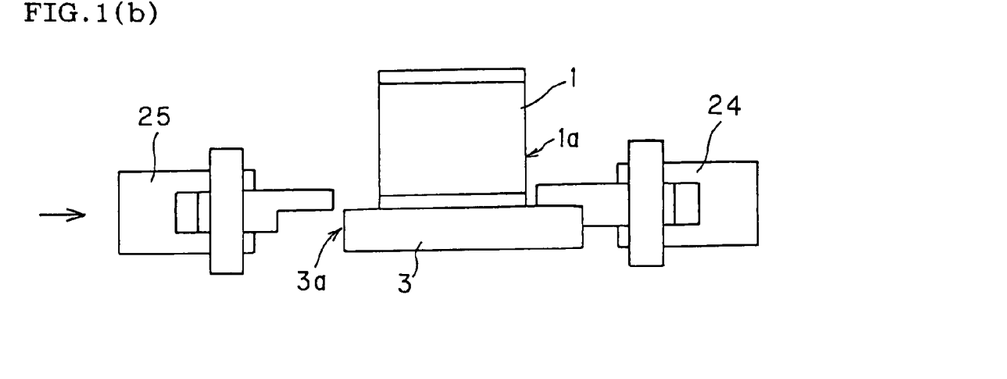
FIG. 1(b) is a front view showing the state in which the positioning fixture abuts on the seat.
Figure 1C:
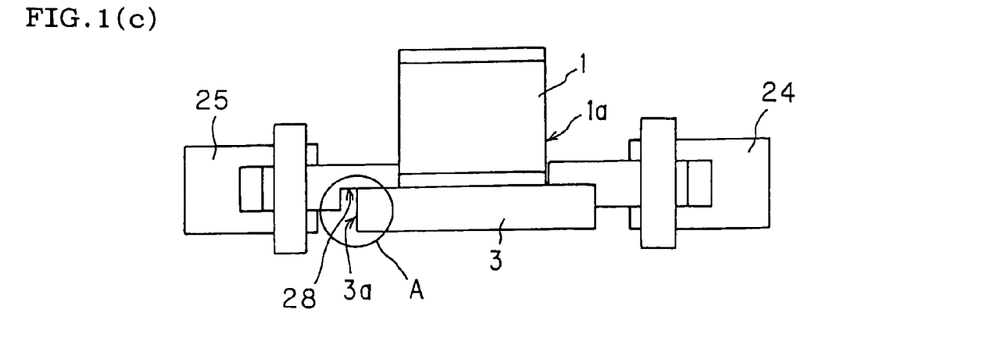
FIG. 1(c) is a front view showing the state in which the columnar structure is positioned using the positioning fixture and the positioning adjustment fixture in the manner such that its central axis may approximately coincide with the central axis of the seat.
Figure 2:
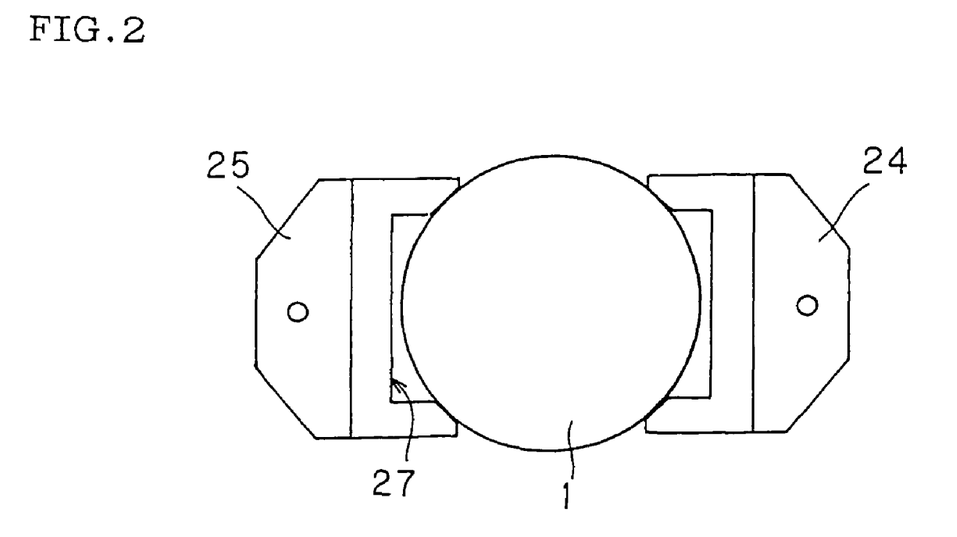
FIG. 2 is a plan view showing the state in which the columnar structure is supported by the positioning fixture and the positioning adjustment fixture at four points.
Figure 3A:
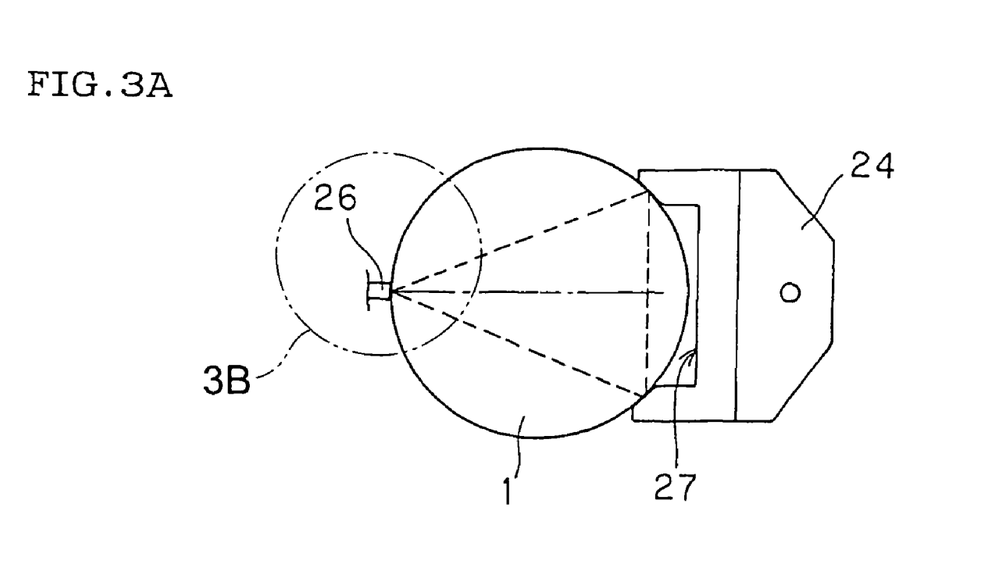
FIG. 3(a) is a plan view showing the state in which the columnar structure is supported by the positioning fixture and the positioning adjustment fixture at three points.

FIG. 1(a) (b) (c) are schematic illustrations of one embodiment of the method and the device for positioning a columnar structure of the present invention, wherein FIG. 1(a) is a front view showing arrangement of a positioning fixture and a positioning adjustment fixture when the columnar structure is mounted on a seat, FIG. 1(b) is a front view showing the state in which the positioning fixture abuts on the seat, and FIG. 1(c) is a front view showing the state in which the columnar structure is positioned using the positioning fixture and the positioning adjustment fixture in the manner such that its central axis may approximately coincide with the central axis of the seat; FIG. 2 is a plan view showing the state in which the columnar structure is supported by the positioning fixture and the positioning adjustment fixture at four points; and FIG. 3(a) is a plan view showing the state in which the columnar structure is supported by the positioning fixture and the positioning adjustment fixture at three points.

A major feature of the method and the device for positioning a columnar structure of the present invention reside in that after mounting a columnar structure 1 on a seat 3, as shown in FIG. 1(a), for example, and after causing a positioning fixture 24 to abut on the seat 3 on which the columnar structure 1 is mounted, as shown in FIG. 1(b), for example, the columnar structure 1 is moved from the seat 3 using a positioning adjustment fixture 25 provided facing vis-à-vis the positioning fixture 24, while keeping the columnar structure 1 abutting (at one or two points) on the positioning adjustment fixture 25, thereby causing the columnar structure 1 to abut on the positioning fixture 24 (see FIG. 1(c)). In this manner, the columnar structure 1 is positioned so that its central axis may approximately coincide with the central axis of the seat 3, in the state in which the columnar structure 1 is supported at four points or three points by the positioning fixture 24 and the positioning adjustment fixture 25 (see FIG. 2 or FIG. 3(a)).

Due to this feature, the method and the device for positioning a columnar structure of the present invention are excellent in the following points as compared with the conventional method and device for positioning a columnar structure shown in FIGS. 4(a), 4(b), and 5.

(1) Because the outer circumferential surface of a columnar structure can be supported at three or four points, not by a plane, precision of approximating the central axis of the columnar structure and the central axis of the seat can be promoted and, in addition, unnecessary contact of the columnar structure with the outer circumferential surface can be prevented, whereby failures or deficits of the outer circumferential surface of a columnar structure can be significantly reduced, resulting in promotion of productivity and an increase in the yield of products.

(2) Because the distance between the central axis of the columnar structure 1 and the central axis of the seat 3 can be maintained constant by previously securing a positioning fixture 24 on the seat 3, as shown in FIG. 1(b), undue deterioration of the precision of approximating the central axis of the columnar structure 1 and the central axis of the seat 3 can be avoided. In this instance, since the positioning adjustment fixture 25 does not abut on the side 3a of the seat (see circled part A of FIG. 1(c)), the positioning adjustment fixture 25 is neither secured nor restrained by the seat 3. Therefore, the columnar structure 1 can be supported without fail at three or four points using the positioning fixture 24 and the positioning adjustment fixture 25.

(3) Because the movement of the columnar structure 1 mounted on the seat 3 can be minimized by previously securing the positioning fixture 24 on the seat 3, as shown in FIG. 1(b), a load accessed on the columnar structure 1 can be reduced. In addition, because the central axis of the columnar structure 1 and the central axis of the seat 3 can be easily approximated by merely sliding the positioning adjustment fixture 25 manually or using a driving force (servo+air cylinder), the cost can be reduced due to a simplified device.

(4) Because the central axis of the columnar structure 1 and the central axis of the seat 3 can be approximated without fail when a coating is applied to the outer circumferential surface of the columnar structure (ceramic honeycomb structure), the coating thickness can be made homogeneous without decenteringly rotating the columnar structure 1 (ceramic honeycomb structure) and properties of the resulting columnar structure such as thermal shock resistance, isostatic strength, thermal stress, mechanical stress, and the like can be promoted. In addition, superior drying performance of the coated part can promote the productivity.

The positioning device of a columnar structure of the present invention is provided, as shown in FIGS. 1(a)-1(c), for example, with a seat 3 on which the columnar structure 1 is mounted, a positioning fixture 24 which can move so as to approach or withdraw from either the left or right side of the seat 3 or abut on the seat 3, and a positioning adjustment fixture 25 provided opposing the positioning fixture 24, which after the positioning fixture 24 has abutted on the seat 3, causes the columnar structure 1 to move and abut on the positioning fixture 24, while keeping the positioning adjustment fixture 25 abutting on the columnar structure 1, thereby causing the central axis of the columnar structure 1 to approximately coincide with the central axis of the seat 3.

A main feature of the positioning device for the columnar structure of the present invention is that, after the positioning fixture 24 has been previously secured on the seat 3 for positioning the columnar structure 1, the columnar structure 1 is moved from the seat 3 using the positioning adjustment fixture 25 to cause the columnar structure 1 to abut on the positioning fixture 24, thereby causing the central axis of the columnar structure 1 to approximately coincide with the central axis of the seat 3 (see FIGS. 1(a)-1(c)).

Another feature of the positioning device of a columnar structure of the present invention is that, as shown in the circled part A of FIG. 1(c), the positioning adjustment fixture 25 is provided with a sliding member 28 which does not abut on the side 3a of the seat. This configuration inhibits the positioning adjustment fixture 25 from being secured or restrained by the seat 3, thereby ensuring that the columnar structure 1 abuts on the positioning fixture 24 without fail using the positioning adjustment fixture 25.

In this manner, since the positioning device of the columnar structure of the present invention can minimize the move of the columnar structure mounted on the seat, a load accessed on the columnar structure can be reduced. In addition, because the positioning adjustment fixture can be caused to slide not only by using a driving force (servo+air cylinder), but also manually with ease, the central axis of the columnar structure and the central axis of the seat can be easily approximated. This feature can simplify the device and reduce the cost.

In the method and the device for positioning a columnar structure of the present invention, the positioning fixture 24 and/or the positioning adjustment fixture 25 preferably have a rectangularly concave cross-section, as shown in FIG. 2. The reason is that, a rectangularly concave part 27 can be provided so as not to abut on a circular arc, particularly in the case of a cylindrical columnar structure.

Figure 3B:
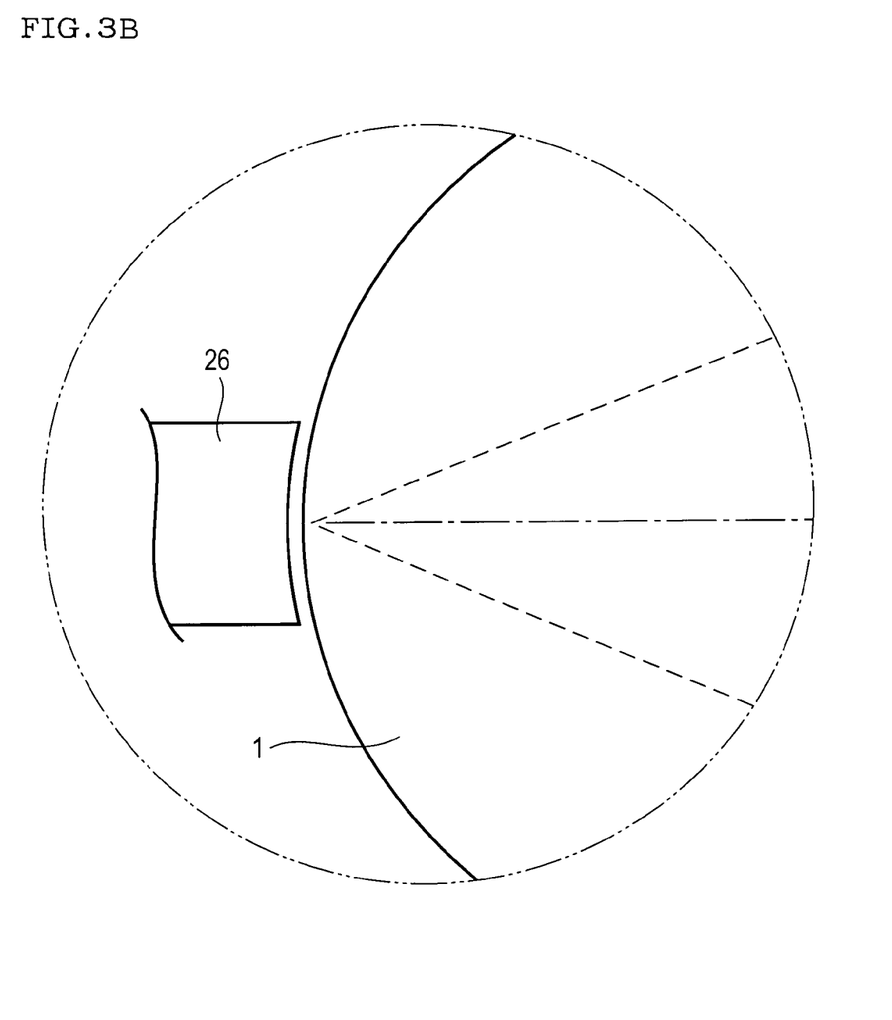
FIG. 3(b) shows details in FIG. 3(a).

In addition, in the method and the device for positioning the columnar structure of the present invention, the cross-section of the positioning adjustment fixture 26 may have a convex form cross-section as shown in FIG. 3(b). In this manner, the method and the device for positioning a columnar structure of the present invention can support the columnar structure 1 at three points using the positioning fixture 24 and the positioning adjustment fixture 26, as shown in FIG. 3(a). The positioning adjustment fixture 26 is preferably located on a perpendicular bisector of a line connecting two points which abut the positioning fixture 24 and the columnar structure 1. Manual adjustment is as effective as the adjustment using the positioning adjustment fixture 26.

The method and device for positioning a columnar structure of the present invention can be applied to coating equipment for an outer circumferential surface shown in FIG. 6, for example, wherein the columnar-structure 1 (a ceramic honeycomb structure) positioned by the seat 3 according to the present invention can be held between the cam 2 and seat 3, with the upper end being caused to come in contact with the cam 2 by elevating the seat 3. In this manner, the columnar structure 1 (ceramic honeycomb structure) is held by the cam 2 and the seat 3.

Next, a coating slurry is supplied to a tank 41 shown in FIG. 6 and a supplying-coating means 12, a leveling means 10, and a smoothing means 14 are moved so that an elastic body 10b of the leveling means 10 may come in contact with the outer circumferential surface 1a of the columnar structure 1 (ceramic honeycomb structure) and the smoothing means (not shown) may come in contact with the outer circumferential surface of the cam 2. The distance w between the end of the leveling board 10a on the columnar structure 1 side and the outer circumferential surface of the columnar structure 1 is appropriately adjusted by a smoothing means (not shown) so as to obtain a prescribed coating thickness.

Next, in a state in which the cam 2, the seat 3, and the columnar structure 1 rotate at a predetermined rate of rotation, a coating material is sent to a feed pipe 12a via a pipe 13 using a coating material supply pump (not shown) to supply and apply the coating material onto the outer circumferential surface 1a of the columnar structure 1 (a honeycomb structure) via an opening of a nozzle 12b. A coating can be applied onto the outer circumferential surface 1a of the columnar structure 1 (a ceramic honeycomb structure) while flattening the coating material supplied to the outer circumferential surface 1a of the columnar structure 1 (honeycomb structure) using an elastic body 10b (rubber) of the leveling means 10.

After completion of coating of the outer circumferential surface 1a of the columnar structure 1, rotation of the cam 2 and seat 3 is suspended, and the seat 3 descends. After that, the columnar structure 1 is pushed up using a hold-up board 42 (see FIG. 6) to elevate the end face 1b of the columnar structure 1, thereby moving a mounting pallet 30 to the bottom of the end face 1b. Then, the hold-up board 42 descends to mount the columnar structure 1 on the mounting pallet 30 and move them to a dryer table (not shown). Any excess amount of the coating material after supplied by the supply-coating means 12 is collected in the slurry receiving container 40 provided under the leveling means 10 and reclaimed in a tank 41 (see FIG. 6) using a pump (not shown).

Examples

The present invention will be described below in detail by way of examples. However, the invention should not be construed as being limited to the following examples.

The outer circumferential surface of a columnar structure was coated using a coating device shown in FIG. 6 in the following manner.

Figure 7A:
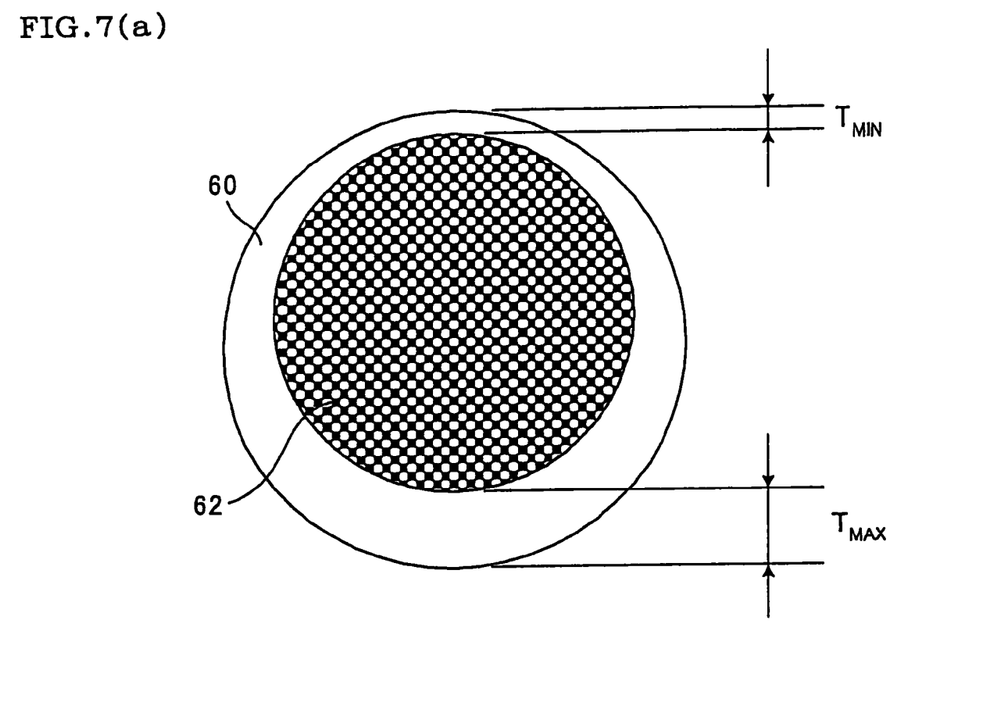
FIG. 7(a) is a cross-sectional view showing the maximum value ($T_{MAX}$) and the minimum value ($T_{MIN}$) of the coating thickness and FIG. 7(b) is a partial enlarged view of FIG. 7(a).
Figure 7B:
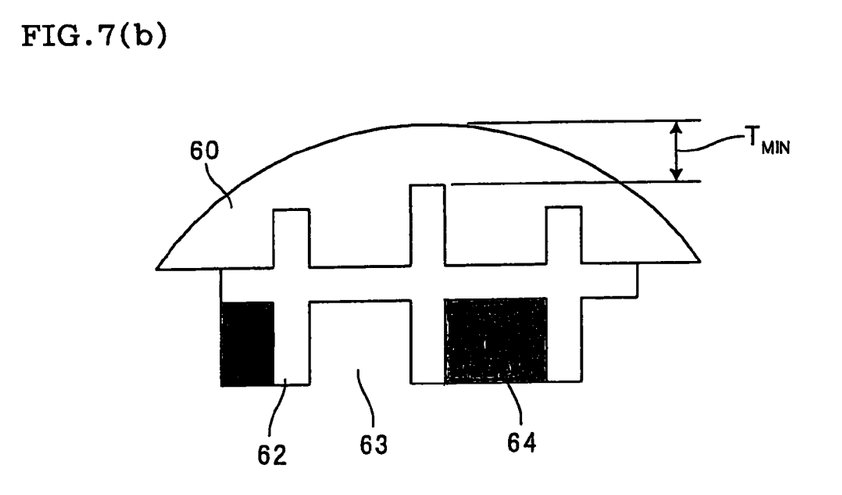

A columnar honeycomb structure having a plurality of cells forming fluid channels was used as a columnar structure. A columnar structure made from cordierite with dimensions of an external diameter of 143 mm f and a height in the central axial direction of 150 mm after grinding of the outer circumferential surface was used. The rib thickness was 0.175 mm and the cell density was 400 cells per square inch. The diameter of a section perpendicular to the cam 2 and the central axis of the seat 3 (diameter of a circle) was approximately the same as the diameter of a section perpendicular to the central axis of the honeycomb structure (diameter of a circle). As shown in FIGS. 7(a) and 7(b), the honeycomb structure has cells 63 formed from a honeycomb substrate material 62. Either of the ends of the cells 63 is closed with a sealing material 64 so that the end face exhibits a checkered pattern.

A coating slurry consisting of 75 wt % of a coating cement ($SiO_2$: 60.0, $Al_2O_3$: 39.2, $Na_2O$: 0.4, MgO: 0.3, and other inorganic compounds: 0.1, containing an antifreeze) and 25 wt % of cordierite powder (average particle diameter: 2 μm) and having viscosity of 20 Pa·s was used.

First, the honeycomb structure 1 was placed on the mounting pallet 30 (see FIG. 6), which was moved to the space above the seat 3. Then, the hold-up board 42 (see FIG. 6) provided in the center of the seat 3 was elevated to mount the honeycomb structure 1 thereon. After the mounting pallet 30 has returned to the original position, the hold-up board 42 descends to mount the honeycomb structure 1 on the seat 3 (see FIG. 1(a)).

Next, after causing the positioning fixture 24 to abut on the seat 3 mounting the honeycomb structure 1 thereon, as shown in FIG. 1(b), the columnar structure 1 is moved from the seat 3 using a positioning adjustment fixture 25 placed opposing the positioning fixture 24, while keeping the columnar structure 1 to abut on the positioning adjustment fixture 25 at two points, thereby causing the honeycomb structure 1 to abut on the positioning fixture 24 (see FIG. 1(c)). In this manner, the honeycomb structure 1 was positioned at four points so that its central axis approximately coincided with the central axis of the seat 3, as shown in FIG. 2 (Examples 1-3).

On the other hand, for comparison, the honeycomb structure 1 was mounted using the centering boards 21 and 21, shown in FIG. 6, so that the central axis approximately coincided with the central axis of the cam 2 and the seat 3, as shown in FIGS. 4(a), 4(b), and 5 (Comparative Examples 1-3).

The upper end of the honeycomb structure 1 disposed on the seat 3 was caused to contact the cam 2 by elevating the seat 3, so that the honeycomb structure 1 could be held between the cam 2 and the seat 3. In this manner, the honeycomb structure 1 was held by the cam 2 and the seat 3. The external diameter of the cam 2 and the seat 3 was 145 mm.

In addition, the coating slurry was supplied to the tank 41 shown in FIG. 6. Next, the supplying-coating means 12, the leveling means 10, and the smoothing means 14 were moved as shown in FIG. 6, so that the elastic body 10b of the leveling means 10 may come in contact with the outer circumferential surface 1a of the honeycomb structure 1 and the smoothing means 14 may come in contact with the outer circumferential surface of the cam 2. In this instance, the distance w between the end of the leveling board 10a on the honeycomb structure 1 side and the outer circumferential surface of the honeycomb structure 1 was adjusted so that the coating thickness on the outer circumferential surface 1a of the honeycomb structure 1 may be 1 mm. A rubber (isoprene rubber) sheet was used as the material of the elastic body 10b.

In this state, a coating material was sent to the feed pipe 12a via the pipe 13 from the tank 41 using the coating material supply pump (not shown in the Figure) to supply and apply the coating material onto the outer circumferential surface 1a of the honeycomb structure 1 via an opening of the nozzle 12b. The coating material applied to the outer circumferential surface 1a of the honeycomb structure 1 was leveled using the elastic body 10b (rubber) of the leveling means 10, thereby completing the coating over the surface of the outer circumferential surface 1a of the honeycomb structure 1 (coating thickness: 1 mm). In this instance, the cam 2 and the seat 3 were rolled three times at 10 rpm during the supply and coating operation, and then rolled one time at 10 rpm to level the surface.

The coating thickness and thermal shock resistance of the coating produced on the outer circumferential surface of the honeycomb structures obtained in Examples 1-3 and Comparative Examples 1-3 were evaluated. The results are shown in Table 1. The coating thickness and thermal shock resistance were evaluated as follows.

(Evaluation of Coating Thickness)

The coated honeycomb structure was cut into round shapes at three points, i.e. at 20 mm from the upper end, center, and 20 mm from bottom, to obtain three cross-sections of the honeycomb structure. The coating thickness of the cross-section samples of the honeycomb structure was measured at ten arbitrarily selected points using a microscope. The maximum value ($T_{MAX}$) and the minimum value ($T_{MIN}$) of the coating thickness were taken. The difference between the maximum value ($T_{MAX}$) and the minimum value ($T_{MIN}$) of the coating thickness was determined for each of the three cross-sections of the honeycomb structure. The coating thickness was evaluated by means of the difference between the maximum value ($T_{MAX}$) and the minimum value ($T_{MIN}$) of the coating thickness (see FIGS. 7(a), 7(b)).

(Evaluation of Thermal Shock Resistance)

A honeycomb structure was inserted into an electric furnace with a specified temperature, heated for 30 minutes, removed from the furnace, and allowed to stand at room temperature. After cooling the honeycomb structure, the surface of the coating material was inspected to determine presence or absence of cracks penetrating the coating material. The thermal shock resistance was determined by repeating this test while gradually increasing the heating temperature in the electric furnace to determine the temperature at which production of cracks was confirmed.

TABLE 1

|  | Maximum value of coating thickness ($T_{MAX}$) | Minimum value of coating thickness ($T_{MIN}$) | Difference of coating thickness ($T_{MAX} - T_{MIN}$) | Results of thermal shock resistance test |
| --- | --- | --- | --- | --- |
| Example 1 | 1.10 | 0.90 | 0.2 | No cracks |
| Example 2 | 1.05 | 0.95 | 0.1 | No cracks |
| Example 3 | 1.10 | 0.90 | 0.2 | No cracks |

TABLE 1-continued

| | Maximum value of coating thickness ($T_{MAX}$) | Minimum value of coating thickness ($T_{MIN}$) | Difference of coating thickness ($T_{MAX}-T_{MIN}$) | Results of thermal shock resistance test |
|---|---|---|---|---|
| Comparative Example 1 | 1.25 | 0.75 | 0.5 | Cracks were generated |
| Comparative Example 2 | 1.15 | 0.85 | 0.3 | Cracks were generated |
| Comparative Example 3 | 1.30 | 0.70 | 0.6 | Cracks were generated |

The results of Table 1 confirm that the variation of the coating thickness of the honeycomb structure was as small as 0.1-0.2 mm and the coating exhibited sufficient thermal shock resistance to be usable in practice by the application of the positioning method of the columnar structure of the present invention.

On the other hand, it was confirmed that, if a related-art positioning method of a columnar structure was used, the coating possessed only poor thermal shock resistance due to the large variation in the coating thickness of the honeycomb structure as large as 0.3-0.6 mm.

The positioning method and a device for a columnar structure of the present invention can be suitably used to cause the central axis of the columnar structure to approximately coincide with the central axis of a seat when a coating is applied to the outer circumferential surface of the columnar structure, particularly a ceramic honeycomb structure.

What is claimed is:

1. A device for positioning a columnar structure, the columnar structure having a central axis, the device comprising:
    a seat having a surface and a central axis that is substantially perpendicular to the surface of the seat, the seat being configured to mount the columnar structure thereon;
    a positioning fixture configured to move at a first side of the seat in a direction parallel with the surface of the seat and to abut on the seat; and
    a positioning adjustment fixture provided to face the positioning fixture on a second side of the seat, the second side being across the seat from the first side, the positioning adjustment fixture configured to move in a direction parallel with the surface of the seat, wherein, after the positioning fixture has abutted on the seat, the positioning adjustment fixture abuts on the columnar structure and causes the columnar structure to move along the surface of the seat and to abut on the positioning fixture, thereby causing the central axis of the columnar structure to approximately coincide with the central axis of the seat,
wherein one of the positioning fixture and the positioning adjustment fixture has a first rectangularly concave cross-section, the first rectangularly concave cross-section including a first inner concave section between first outer fingers, the first inner concave section being a rectangular cross section.

2. The device according to claim 1, wherein the positioning adjustment fixture has a sliding member which does not abut on the side of the seat.

3. The device according to claim 1, wherein the other one of the positioning fixture and the positioning adjustment has a convex cross-section.

4. The device according to claim 1, wherein the other one of the positioning fixture and the positioning adjustment has a second rectangularly concave cross-section, the second rectangularly concave cross-section including a second inner concave section between second outer fingers, the second inner concave section being a rectangular cross section.

* * * * *